United States Patent
Tsutsumi (10) Patent No.: US 9,551,951 B2
(45) Date of Patent: Jan. 24, 2017

(54) IMAGE FORMING APPARATUS COMPRISING DETERMINATION PROCESSING PORTION FOR DETECTING PROPERTY INFORMATION OF PHOTOCONDUCTOR

(71) Applicant: KYOCERA Document Solutions Inc., Osaka-shi, Osaka (JP)

(72) Inventor: Masahiro Tsutsumi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/059,231

(22) Filed: Mar. 2, 2016

(65) Prior Publication Data
US 2016/0259262 A1 Sep. 8, 2016

(30) Foreign Application Priority Data

Mar. 4, 2015 (JP) .................................. 2015-042911

(51) Int. Cl.
G03G 15/00 (2006.01)
G03G 15/02 (2006.01)
H02J 7/00 (2006.01)

(52) U.S. Cl.
CPC ...... *G03G 15/0266* (2013.01); *G03G 15/5037* (2013.01); *H02J 7/007* (2013.01); *H02J 7/0045* (2013.01)

(58) Field of Classification Search
CPC .................. G03G 15/5033; G03G 15/5037
See application file for complete search history.

(56) References Cited

U.S. PATENT DOCUMENTS

| | | | | |
|---|---|---|---|---|
| 6,104,888 A | * | 8/2000 | Kobayashi | G03G 21/1875 399/12 |
| 6,912,364 B2 | * | 6/2005 | Kim | G03G 21/1892 399/112 |
| 7,139,492 B2 | * | 11/2006 | Mitamura | G03G 15/55 399/110 |
| 9,423,743 B2 | * | 8/2016 | Yamada | G03G 21/1875 |

(Continued)

FOREIGN PATENT DOCUMENTS

JP        08314207 A        11/1996

*Primary Examiner* — David Gray
*Assistant Examiner* — Carla Therrien
(74) *Attorney, Agent, or Firm* — Alleman Hall McCoy Russell & Tuttle LLP (57) ABSTRACT

In an image forming apparatus, a first electric pathway connects a charging portion and a power supply unit, a second electric pathway is formed in the photoconductor unit and connects the first electric pathway and the photoconductor. An electrical component is disposed on the second electric pathway and has predetermined electrical property in accordance with the type of the photoconductor unit. A current detection portion is configured to detect current flowing through the second electric pathway when a detection voltage is applied on the first electric pathway. A determination processing portion is configured to determine the type of the photoconductor unit and existence of usage of the photoconductor unit, based on a current value detected by the current detection portion. The blocking portion is configured to block the second electric pathway after determination by the determination processing portion.

9 Claims, 9 Drawing Sheets

(56) References Cited

U.S. PATENT DOCUMENTS

| | | | |
|---|---|---|---|
| 2002/0164169 A1* | 11/2002 | Arai | B41J 2/17546 399/12 |
| 2011/0182594 A1* | 7/2011 | Arai | G03G 15/5004 399/12 |
| 2012/0033981 A1* | 2/2012 | Fukuta | G03G 21/0058 399/12 |
| 2013/0230330 A1* | 9/2013 | Mochiduki | G03G 15/55 399/12 |

* cited by examiner

IMAGE FORMING APPARATUS COMPRISING DETERMINATION PROCESSING PORTION FOR DETECTING PROPERTY INFORMATION OF PHOTOCONDUCTOR

INCORPORATION BY REFERENCE

This application is based upon and claims the benefit of priority from the corresponding Japanese Patent Application No. 2015-042911 filed on Mar. 4, 2015, the entire contents of which are incorporated herein by reference.

BACKGROUND

The present disclosure relates to an image forming apparatus configured to form an image on a sheet member through electrophotographic method.

In an electrophotographic type image forming apparatus, a photoconductor unit including a photoconductor drum is detachably disposed. In this type of an image forming apparatus, property information is read from a storage portion provided to the photoconductor unit, and initial setting of a charging condition of the photoconductor drum is set in some cases. In addition, in order to set the initial setting only when usage of the photoconductor unit has started, the photoconductor unit is determined whether or not to be never used in some cases.

SUMMARY

An image forming apparatus according to one aspect of the present disclosure includes: a photoconductor unit; a charging portion; an apparatus main body; a first electric pathway; a second electric pathway; an electrical component; a voltage control portion; a current detection portion; a determination processing portion; and a blocking portion. The photoconductor unit includes a photoconductor. The charging portion is configured to charge the photoconductor. The apparatus main body is configured to detachably support the photoconductor unit. The first electric pathway is configured to connect the charging portion and a power supply unit. The second electric pathway is formed in the photoconductor unit and is configured to connect the first electric pathway and the photoconductor. The electrical component is disposed on the second electric pathway and has a predetermined electrical property in accordance with the type of the photoconductor unit. The voltage control portion is configured to apply a preset detection voltage on the first electric pathway from the power supply unit. The current detection portion is configured to detect current flowing through the second electric pathway when the detection voltage is applied on the first electric pathway. The determination processing portion is configured to determine the type of the photoconductor unit and existence of usage of the photoconductor unit, based on a current value detected by the current detection portion. The blocking portion is configured to block the second electric pathway after determination by the determination processing portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It should be noted that the following embodiments are merely examples in which the present disclosure is embodied, and therefore do not limit the technical scope of the present disclosure.

First Embodiment

Figure 1:
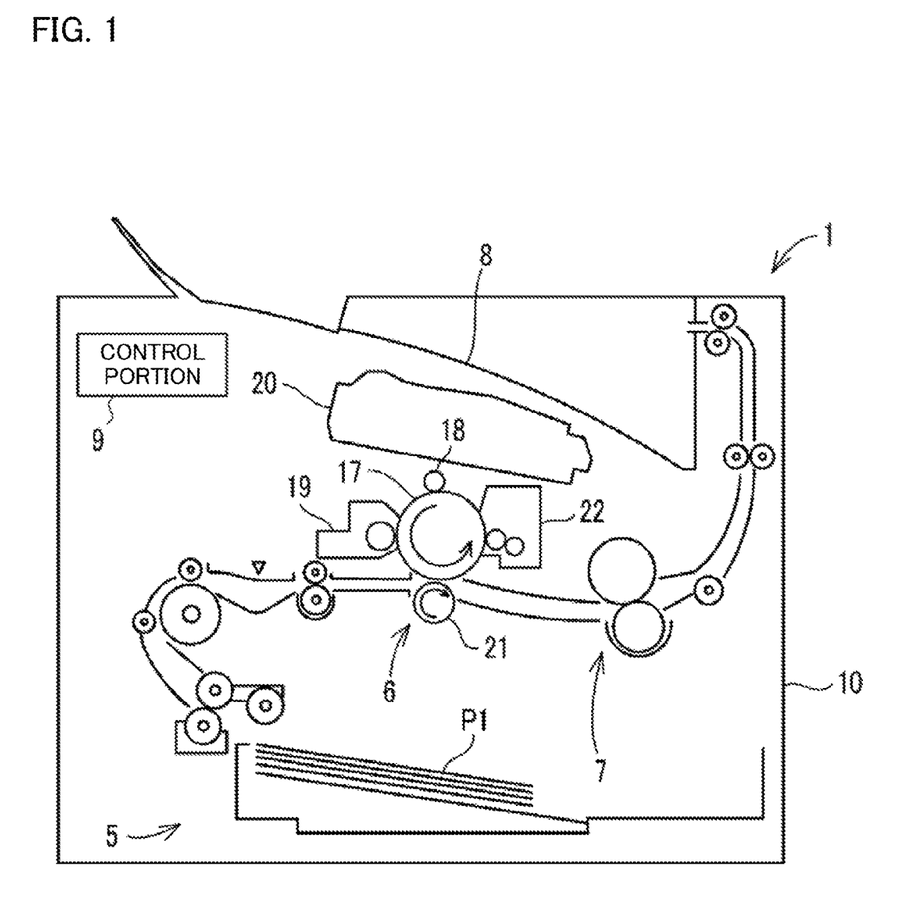
FIG. 1 shows a configuration of an image forming apparatus according to a first embodiment of the present disclosure.

As shown in FIG. 1, an image forming apparatus 1 according to an embodiment of the present disclosure is a printer configured to print an image on a sheet member P1 by using toner, based on image data inputted from outside via a network communication portion that is not shown. It should be noted that a facsimile, a copying machine, or a multifunctional peripheral that combines various functions such as print function, copy function, and facsimile function are also examples of the image forming apparatus according to the present disclosure.

The image forming apparatus 1 includes a sheet feeding portion 5, an image forming portion 6, a fixing portion 7, a sheet discharge portion 8, a control portion 9, and an apparatus main body 10. The image forming portion 6 is an electrophotographic type image forming portion that includes a photoconductor drum 17, a charging portion 18, a developing device 19, an exposure device 20, a transfer device 21, and a cleaning device 22.

The control portion 9 is a microcomputer including, for example, a CPU, a ROM, and a RAM, etc. In the ROM of the control portion 9, processing programs for causing the CPU of the control portion 9 to execute various processes are stored. The processing programs may be stored in the ROM at the time of shipment of the image forming apparatus 1. Alternatively, the processing programs may be recorded in a computer-readable information storage medium such as a CD, a DVD, or a flash memory, and the processing programs may be stored to the ROM of the control portion 9 from the information storage medium after the shipment.

In the image forming portion 6, the photoconductor drum 17 is charged by the charging portion 18. The charging portion 18 is, for example, a contact-charging type charging portion that utilizes a charging roller that makes contact with the circumferential surface of the photoconductor drum 17. Alternatively, the charging portion 18 may be a charging portion of a non-contact type such as scorotron type configured to charge the photoconductor drum 17 without contact.

On the photoconductor drum 17 charged by the charging portion 18, an electrostatic latent image based on image data is formed by the exposure device 20. The electrostatic latent image on the photoconductor drum 17 is developed as a toner image by the developing device 19, and the toner image is transferred on the sheet member P1 by the transfer device 21. Then, the toner image is melted and fixed on the sheet member P1 by the fixing portion 7, and the sheet member P1 is discharged to the sheet discharge portion 8.

Figure 2:
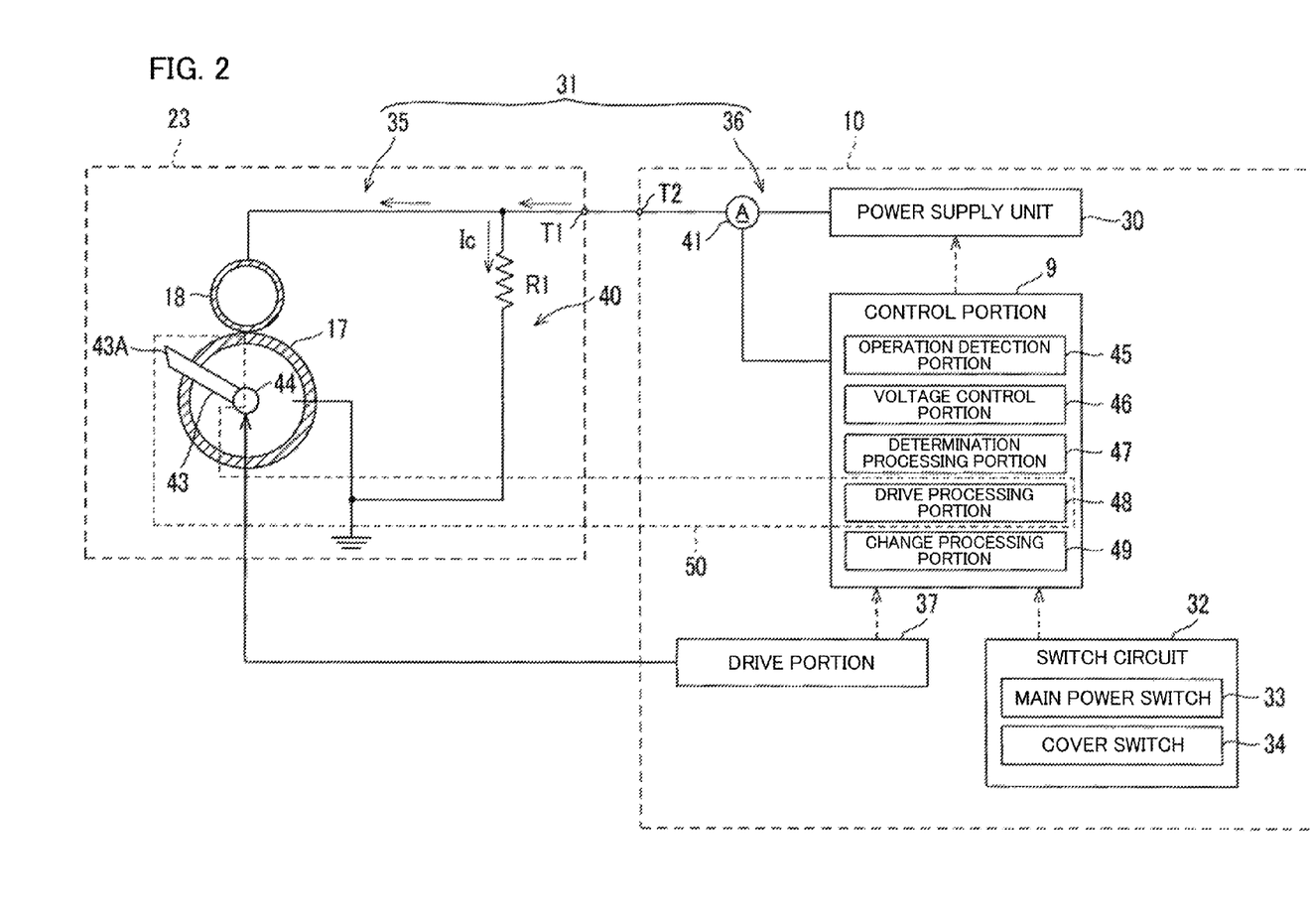
FIG. 2 shows a system configuration in the image forming apparatus according to the first embodiment of the present disclosure.

Here, the charging portion 18 and the photoconductor drum 17 of the image forming portion 6 are integrated as a photoconductor unit 23 (see FIG. 2). The photoconductor drum 17 is one example of a photoconductor. The photoconductor unit 23 is detachably supported on the apparatus main body 10. The apparatus main body 10 has a cover member (not shown) on which opening-and-closing operations required for attaching and detaching the photoconductor unit 23 with respect to the apparatus main body 10 are performed. Although the photoconductor unit 23 includes the photoconductor drum 17 and the charging portion 18 in the present embodiment; a configuration in which the photoconductor unit 23 does not include the charging portion 18 and only includes the photoconductor drum 17, or a configuration in which the photoconductor unit 23 includes another mechanism in addition to, or as substitute for, the charging portion 18 is conceivable as another embodiment.

In particular, multiple types of the photoconductor unit 23 are alternatively mountable on the apparatus main body 10. Image forming conditions that are appropriate during image formation are different depending on the type of the photoconductor unit 23 installed on the apparatus main body 10. For example, properties such as a discharge starting voltage between the photoconductor drum 17 and the charging portion 18 is different depending on the type of the photoconductor unit 23. In order to change the image forming conditions used during image formation in accordance with the type of the photoconductor unit 23 installed on the apparatus main body 10, the control portion 9 has to identify the type of the photoconductor unit 23 and specify property information of the photoconductor unit 23. In addition, in order for setting up image forming conditions when usage of a never-used photoconductor unit 23 begins and then executing image formation in accordance with the image forming conditions, the control portion 9 has to determine whether or not the photoconductor unit 23 is a never-used product.

Here, when a configuration is used in which a fuse is provided in the photoconductor unit 23 and the fuse blows out when the photoconductor unit 23 is installed in the apparatus main body 10; whether or not the photoconductor unit 23 is a never-used product can be determined in accordance with the presence of a blowout of the fuse. However, in such a case, the property information of the photoconductor unit 23 cannot be detected using an electric pathway to which the fuse is connected. On the other hand, as described in the following, the image forming apparatus 1 according to the present embodiment can detect the property information of the photoconductor drum 17 by using an electric pathway for determining whether or not the photoconductor unit 23 is a never-used product.

Next, a system configuration inside the image forming apparatus 1 will be described with reference to FIG. 2. As shown in FIG. 2, the photoconductor unit 23 includes a second electric pathway 40, a third electric pathway 35, a power receiving terminal T1, a resistive element R1, and a cutting member 43, etc. Furthermore, the apparatus main body 10 includes a fourth electric pathway 36, a power supply terminal T2, a power supply unit 30, a switch circuit 32, a drive portion 37, and a current detection portion 41, etc.

The third electric pathway 35 connects the charging portion 18 and the power receiving terminal T1. The second electric pathway 40 connects the third electric pathway 35 and the photoconductor drum 17. The fourth electric pathway 36 connects the power supply unit 30 and the power supply terminal T2. When the photoconductor unit 23 is installed in the apparatus main body 10, the charging portion 18 and the power supply unit 30 are connected by the third electric pathway 35 and the fourth electric pathway 36. More specifically, the charging portion 18 and the power supply unit 30 are connected via the third electric pathway 35, the power receiving terminal T1, the power supply terminal T2, and the fourth electric pathway 36. Hereinafter, the electric pathway formed by the third electric pathway 35 and the fourth electric pathway 36 is referred to as a first electric pathway 31. In addition, when the photoconductor unit 23 is installed in the apparatus main body 10, the photoconductor drum 17 is grounded through the apparatus main body 10.

The resistive element R1 is one example of an electrical component for identifying the type of the photoconductor unit 23. Specifically, the resistive element R1 is disposed on the second electric pathway 40 of the photoconductor unit 23, and has a resistance value Rx (one example of an electrical property) predetermined in accordance with the type of the photoconductor unit 23. Here, in the second electric pathway 40, an electric wire is formed between the resistive element R1 and the photoconductor drum 17, or between the resistive element R1 and the third electric pathway 35.

The cutting member 43 is mounted on a rotational shaft 44 of the photoconductor drum 17, and has a cutting blade 43A for cutting the electric wire forming the second electric pathway 40 connected to the photoconductor drum 17. The cutting member 43 moves integrally with the photoconductor drum 17 associated with rotational driving of the photoconductor drum 17, and makes contact with the electric wire to cut the electric wire. More specifically, in the photoconductor unit 23, the electric wire is wired via a position where electric wire is cut by the cutting blade 43A when the cutting member 43 is rotationally driven. As a result, current will not subsequently flow through the second electric pathway 40, and a photoconductor unit 23 that is installed in the apparatus main body 10 becomes different from a photoconductor unit 23 that is a never-used product.

The power supply unit 30 includes, a not-shown transformer and the like for generating a required voltage from a supply voltage applied from an external power supply such as, for example, a commercial power source (not shown). When the voltage applied on the charging portion 18 from the power supply unit 30 is equal to or higher than a discharge starting voltage Vs between the charging portion 18 and the photoconductor drum 17, current flows from the power supply unit 30 through the charging portion 18 to the photoconductor drum 17, and the photoconductor drum 17 becomes charged.

The switch circuit 32 includes a main power switch 33 and a cover switch 34, etc., provided on the image forming apparatus 1, and inputs, to the control portion 9, operation signals indicating detection results of the main power switch 33 and the cover switch 34. The main power switch 33 accepts a user operation for instructing start or stop to supply required power with respect to each portion of the image forming apparatus 1. The cover switch 34 detects opening and closing of the cover member.

The drive portion 37 includes a drive motor configured to rotationally drive the photoconductor drum 17, and a motive-power transmission mechanism configured to transmit the driving force of the drive motor to the photoconductor drum 17. The drive motor is, for example, a servomotor such as a direct current brushless motor.

The current detection portion 41 detects a current Ic flowing through the fourth electric pathway 36 and inputs the current Ic in the control portion 9. The current detection portion 41 includes, for example, a shunt resistance, a current sensor using a Hall element, or the like.

In the image forming apparatus 1, the control portion 9 functions as, by executing various processes in accordance with the programs by using the CPU, an operation detection portion 45, a voltage control portion 46, a determination processing portion 47, a drive processing portion 48, and a change processing portion 49. A configuration in which one part or multiple functions of the control portion 9 are implemented as electronic circuits is also conceivable as another embodiment.

The operation detection portion 45 detects whether or not a predetermined user operation has been performed, based on an operation signal inputted from the switch circuit 32. The predetermined user operation is, for example, a user operation performed when the photoconductor unit 23 is replaced. For example, the user operation is a pressing operation on a power button or a closing operation of the cover member, and the operation signal is an operation signal outputted from the cover switch 34 or the main power switch 33 of the switch circuit 32. A user operation, performed with respect to a not-shown operation portion for inputting the fact that replacement of the photoconductor unit 23 has been conducted, is also one example of the predetermined user operation.

The voltage control portion 46 applies a detection voltage Vd, which is smaller than the discharge starting voltage Vs in terms of voltage value, on the first electric pathway 31 from the power supply unit 30. In the present embodiment, when the user operation has been detected to have been performed by the operation detection portion 45, the detection voltage Vd is applied on the first electric pathway 31 from the power supply unit 30. Furthermore, the voltage control portion 46 may apply the detection voltage Vd on the first electric pathway 31 from the power supply unit 30 at a certain time interval.

More specifically, the detection voltage Vd is a value lower than the voltage value of the discharge starting voltage Vs. Thus, when the detection voltage Vd is applied on the first electric pathway 31 from the power supply unit 30, a discharge does not occur between the circumferential surface of the charging portion 18 and the circumferential surface of the photoconductor drum 17, and current does not flow through the third electric pathway 35. On the other hand, current flows through the second electric pathway 40 when the electric wire of the second electric pathway 40 has not been cut by the cutting member 43, whereas current does not flow through the second electric pathway 40 when the electric wire has been cut by the cutting member 43.

The determination processing portion 47 can determine the type of the photoconductor unit 23 and the existence of usage (existence of usage history) of the photoconductor unit 23, based on the current value detected by the current detection portion 41 when the detection voltage Vd is applied on the first electric pathway 31 by the voltage control portion 46.

Specifically, the determination processing portion 47 acquires the current detection signal from the current detection portion 41 when the detection voltage Vd is applied. The determination processing portion 47 can determine whether or not the photoconductor unit 23 installed in the apparatus main body 10 is a never-used product, based on whether or not the current value of the detection current Ic indicated by the current detection signal is zero.

More specifically, as described above, when the photoconductor unit 23 is not a never-used product, the electric wire is cut and current does not flow through the second electric pathway 40, whereby the current value of the detection current Ic indicated by the current detection signal becomes zero. On the other hand, when the photoconductor unit 23 is a never-used product, the electric wire is not cut and current flows through the second electric pathway 40, whereby the current value of the detection current Ic indicated by the current detection signal does not become zero. The determination processing portion 47 determines that, when the current value is zero, the photoconductor unit 23 installed in the apparatus main body 10 is a never-used product; whereas the determination processing portion 47 determines that, when the current value is not zero, the photoconductor unit 23 is a never-used product.

In addition, the determination processing portion 47 can determine the type of the photoconductor unit 23 based on the current value of the detection current Ic detected by the current detection portion 41. The type of the photoconductor drum 17 conceivably concerns, for example, a charge property of the photoconductor drum 17 or a sensitivity property of the photoconductor drum 17. The sensitivity property is the potential (bright potential) of the electrostatic latent image formed on the surface of the photoconductor drum 17 when laser light is emitted on the photoconductor drum 17.

Specifically, the current value of the detection current Ic detected by the current detection portion 41, and table information TA1 (see FIG. 3) indicating detection current Ic and charging voltage Vc corresponding to the type of the photoconductor unit 23, are stored in the ROM of the control portion 9 in advance. Based on the table information TA1, the determination processing portion 47 determines the type of the photoconductor unit 23 corresponding to the current value of the detection current Ic detected by the current detection portion 41 when the detection voltage Vd is applied.

Figure 3:
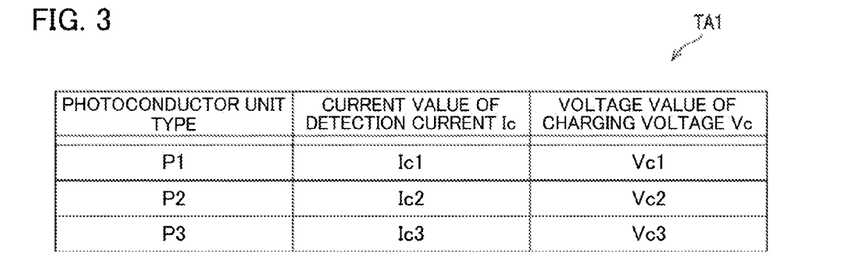
FIG. 3 shows table information indicating charging voltage and detection current corresponding to the type of a photoconductor unit.

For example, when the current value of the detection current Ic detected by the current detection portion 41 is Ic1, the determination processing portion 47 determines the type of the photoconductor unit 23 as type P1. The determination processing portion 47 may specify the resistance value Rx of the resistive element R1 mounted in the photoconductor unit 23 based on the current value of the detection current Ic detected by the current detection portion 41, and determine the type of the photoconductor unit 23 based on this resistance value Rx.

The drive processing portion 48 drives the drive portion 37 after the determination by the determination processing portion 47. With this, the cutting member 43 moves integrally with the photoconductor drum 17, associated with rotational driving of the photoconductor drum 17, and, after the determination by the determination processing portion 47, the electric wire is cut by the cutting member 43.

In the present embodiment, the cutting member 43 and the drive processing portion 48 are one example of a blocking portion 50. Another conceivable embodiment of the blocking portion 50 is one in which the second electric pathway 40 is connected to the photoconductor drum 17 at a position where an acceptable tension is exceeded associated with rotational driving of the photoconductor drum 17. Still another conceivable embodiment of the blocking portion 50 is one in which the second electric pathway 40 is connected with the photoconductor drum 17 by wiring such as the electric wire, and a tensile force exceeding an acceptable tension is applied on the electric wire by rotational driving of the photoconductor drum 17 after the determination by the determination processing portion 47 to cause the electric wire to become cut. With this, the cutting member 43 can be omitted.

The change processing portion 49 changes image forming conditions for the image forming apparatus 1 in accordance with the type of the photoconductor unit 23 determined by the determination processing portion 47. For example, the image forming conditions are conditions such as the charging voltage Vc (charging condition) applied on the photoconductor drum 17 and the charging portion 18 during image formation, or intensity (exposure condition) of laser light emitted on the photoconductor drum 17 by the exposure device 20.

Specifically, the change processing portion 49 determines a voltage value of the charging voltage Vc corresponding to the type of the photoconductor unit 23 determined by the determination processing portion 47 based on the table information TA1, and sets this voltage value as a voltage value of the charging voltage Vc of the photoconductor drum 17 during image formation. Then, the change processing portion 49 controls the power supply unit 30 during image formation, applies, on the charging portion 18, the charging voltage Vc of the voltage value set in accordance with the type of the photoconductor unit 23, and charges the photoconductor drum 17.

For example, when the type of the photoconductor unit 23 determined by the determination processing portion 47 is type P1, the change processing portion 49 determines the voltage value of the charging voltage Vc corresponding to type P1 as a voltage value Vc1. Then, during image formation, the control portion 9 controls the power supply unit 30, applies the charging voltage Vc of the determined voltage value Vc1 on the charging portion 18, and charges the photoconductor drum 17.

When the type of the photoconductor unit 23 is determined based on the sensitivity property of the photoconductor drum 17, the change processing portion 49 may change the intensity of laser light outputted from the exposure device 20 in accordance with the determined type of the photoconductor unit 23.

Next, by using FIG. 4, an operating-condition setting process executed by the control portion 9 will be described.

Figure 4:
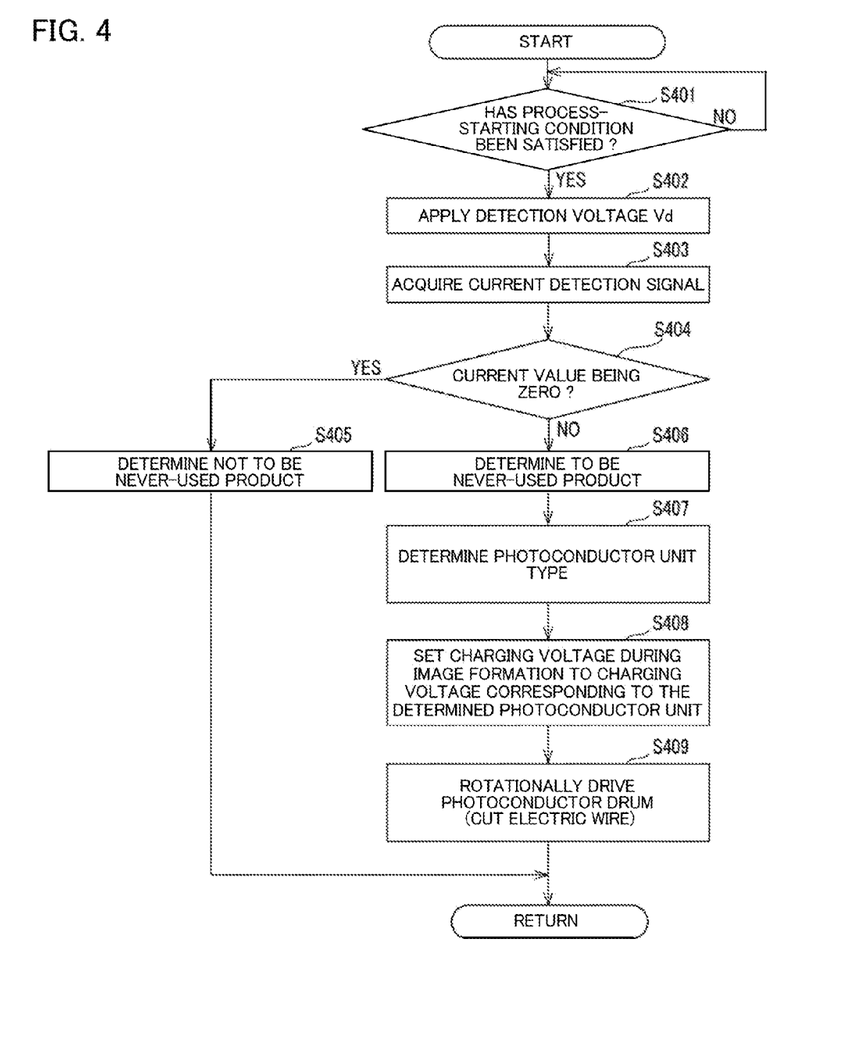
FIG. 4 is a flowchart showing an operating-condition setting process for the photoconductor unit performed by a control portion.

In the flowchart in FIG. 4, steps S401, S402, . . . each represent a process procedure (step number).

<Step S401>

At step S401, the control portion 9 determines whether or not a starting condition for starting the operating-condition setting process has been satisfied. The starting condition is, for example, the operation detection portion 45 receiving, from the main power switch 33, the operation signal indicating that an operation of turning on the power supply by using the power button has been conducted. Alternatively, the starting condition is the operation detection portion 45 receiving, from the cover switch 34, an operation signal indicating that an operation of closing the cover member has been conducted. While the control portion 9 determines that the starting condition has not been satisfied (NO at step S401), the control portion 9 repeatedly executes the process at step S401. On the other hand, when the control portion 9 determines that the starting condition has been satisfied (YES at step S401), the control portion 9 advances the process to step S402.

<Step S402>

At step S402, the voltage control portion 46 applies the detection voltage Vd on the first electric pathway 31 from the power supply unit 30.

<Step S403>

At step S403, the determination processing portion 47 acquires the current detection signal from the current detection portion 41.

<Step S404>

At step S404, the determination processing portion 47 determines whether or not the current value indicated by the current detection signal acquired at step S403 is zero. When the determination processing portion 47 determines that the current value is zero (YES at step S404), the determination processing portion 47 advances the process to step S405. On the other hand, when the determination processing portion 47 determines that the current value is not zero (NO at step S404), the determination processing portion 47 advances the process to step S406.

<Step S405>

At step S405, the determination processing portion 47 determines that the photoconductor unit 23 installed in the apparatus main body 10 is not a never-used product. Then, the control portion 9 returns the process to step S401. Thus, when the photoconductor unit 23 is not a never-used product, since setting up the image forming conditions corresponding to the type of the photoconductor unit 23 has already been executed, steps S407 and S408 described later are omitted.

<Step S406>

At step S406, the determination processing portion 47 determines that the photoconductor unit 23 installed in the apparatus main body 10 is a never-used product.

<Step S407>

At step S407, the determination processing portion 47 determines the type of the photoconductor unit 23 based on the detection current Ic and the table information TA1 (see FIG. 3).

<Step S408>

At step S408, the change processing portion 49 sets up the charging condition of the photoconductor drum 17 during image formation, based on the type of the photoconductor unit 23 determined at step S407. Specifically, the change processing portion 49 determines a voltage value of the charging voltage Vc corresponding to the type of the photoconductor unit 23 determined by the determination processing portion 47 based on the table information TA1 (see FIG. 3). Then, the change processing portion 49 sets this determined voltage value as a voltage value of the charging voltage Vc applied on the charging portion 18 during image formation.

<Step S409>

At step S409, the drive processing portion 48 drives the drive portion 37 only for a predetermined time. With this, the cutting member 43 cuts the electric wire associated with rotational driving of the photoconductor drum 17. As a result, current will not subsequently flow through the second electric pathway 40, and a photoconductor unit 23 that is installed in the apparatus main body 10 becomes different from a photoconductor unit 23 that is a never-used product. Another conceivable embodiment is one in which step S409 is omitted, and, during a warm-up operation of transitioning the image forming portion 6 to a state in which image formation is possible, the cutting member 43 cuts the electric wire when the drive portion 37 is driven. In this case, the control portion 9 controlling the image forming portion 6 to execute the warm-up operation is one example of the drive processing portion 48.

As described above, in the image forming apparatus 1 according to present embodiment, the second electric pathway 40 having the resistive element R1 for the resistance value Rx in accordance with the type of the photoconductor unit 23 is disposed in the photoconductor unit 23, and the second electric pathway 40 is blocked after the current value in the second electric pathway 40 is detected. Then, based on the current value, the type and existence of usage (a never-used product or not) of the photoconductor unit 23 are determined. In this manner, the image forming apparatus 1 according to the present embodiment can detect the type of the photoconductor unit 23 by using the second electric pathway 40 for determining whether or not the photoconductor unit 23 is a never-used product.

Second Embodiment

Next, a second embodiment of the present disclosure will be described. It should be noted that members, etc., in common with the first embodiment are given the same number as in the first embodiment, and description of contents in common with the first embodiment is omitted.

Figure 5:
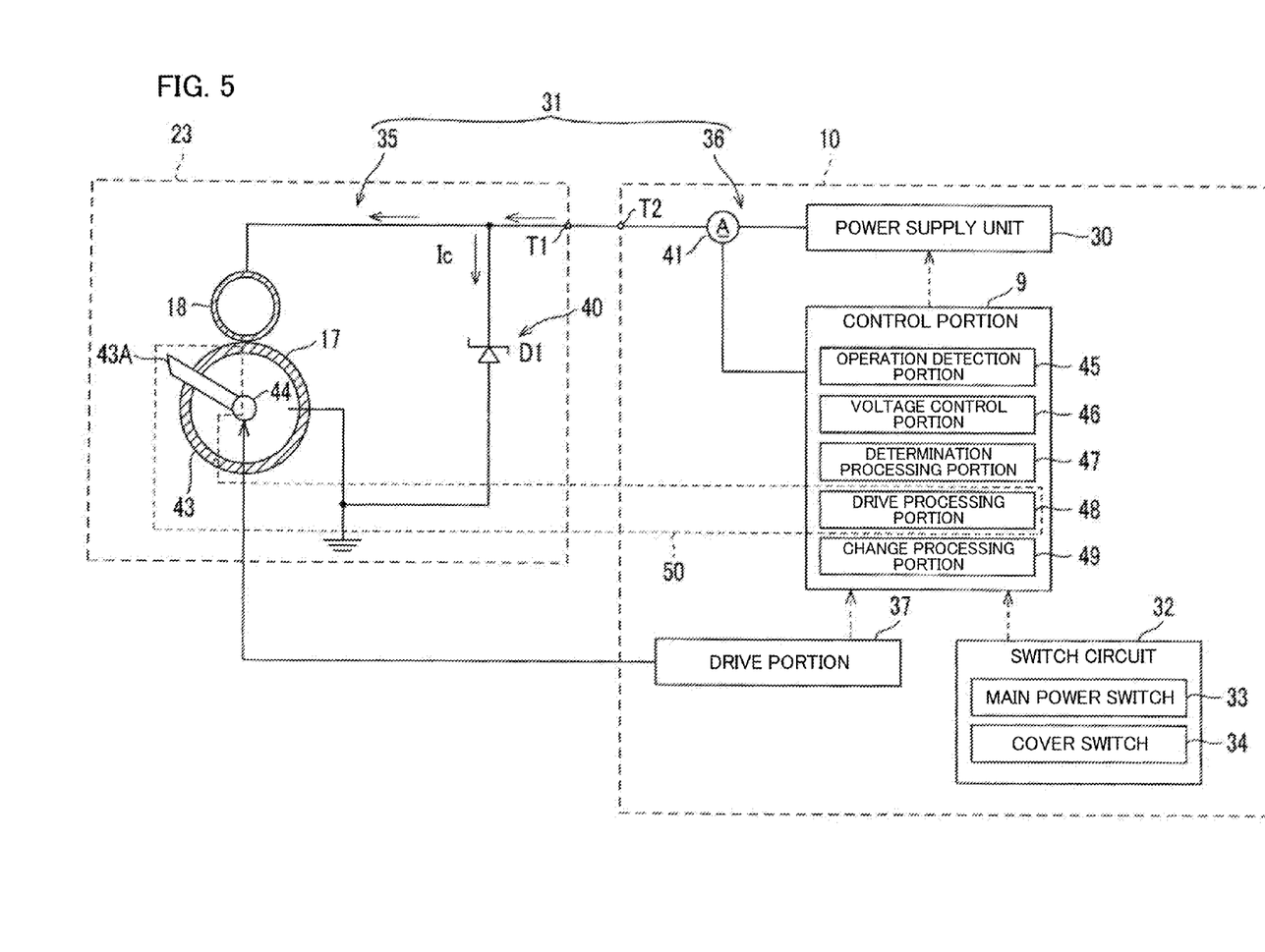
FIG. 5 shows a system configuration in the image forming apparatus according to a second embodiment of the present disclosure.

In the second embodiment, as shown in FIG. 5, instead the resistive element R1 in the first embodiment, a voltage-regulator diode D1 having a breakdown voltage Vb (one example of the electrical property) predetermined in accordance with the type of the photoconductor unit 23 is provided as the electrical component. In the second electric pathway 40, the voltage-regulator diode D1 has an anode connected to the photoconductor drum 17 and a cathode connected to the power supply unit 30, and a reverse voltage is applied on the voltage-regulator diode D1.

Figure 6A:
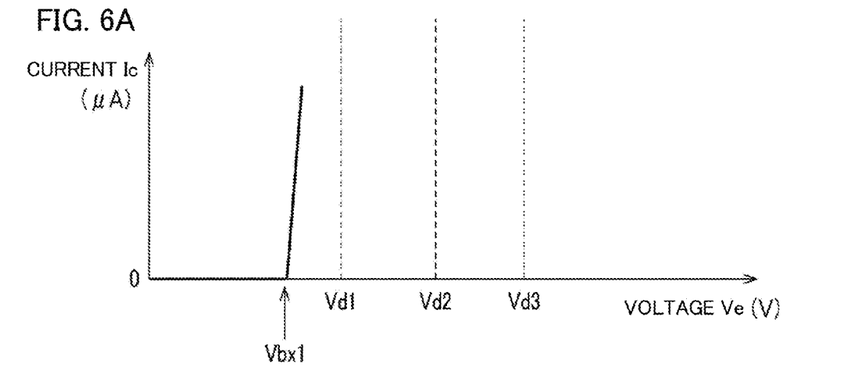
FIGS. 6A, 6B, and 6C are graphs showing current-voltage properties of voltage-regulator diodes having different breakdown voltages.
Figure 6B:
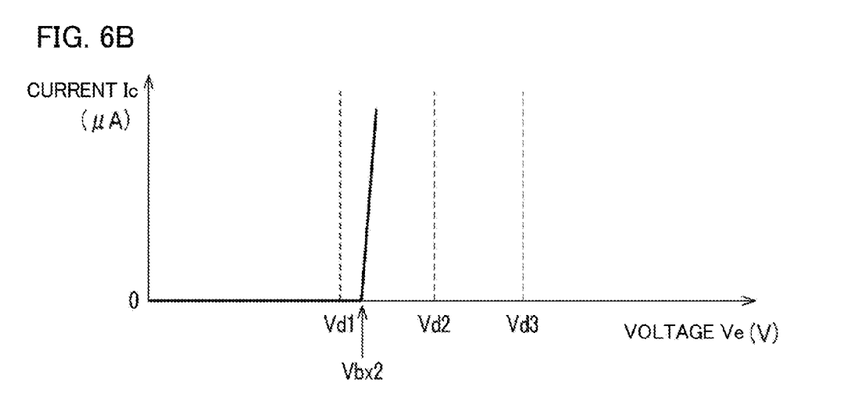
Figure 6C:
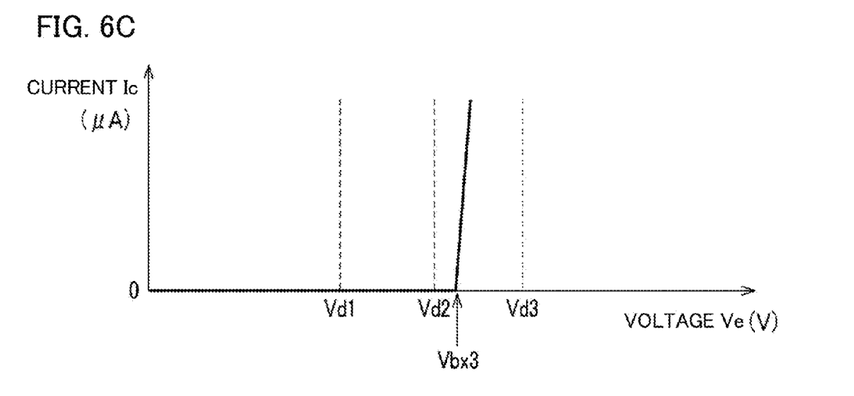

FIGS. 6A to 6C show the relationship between voltage Ve and detection current Ic, wherein the horizontal axis represents a voltage value of a voltage Ve applied on the second electric pathway 40 (the voltage-regulator diode D1) and the vertical axis represents a current value of a current (detection current) Ic flowing through the second electric pathway 40.

The reversely connected voltage-regulator diode D1 has an electrical property (current-voltage property) as shown in FIGS. 6A to 6C. More specifically, the reversely connected voltage-regulator diode D1 practically does not allow current to pass therethrough in a voltage value range of the voltage Ve between the anode and the cathode up to the breakdown voltage Vb. In addition, the reversely connected voltage-regulator diode D1 allows current to pass therethrough in a range from the breakdown voltage Vb and beyond, and the current largely increases with respect to a minute increase in the voltage value. In other words, the voltage Ve applied on the voltage-regulator diode D1 is maintained almost at a constant voltage value within a voltage value range from the breakdown voltage Vb and beyond.

The voltage-regulator diode D1 has the breakdown voltage Vb that is predetermined in accordance with the type of the photoconductor unit 23. FIGS. 6A to 6C show current-voltage properties of three types of the voltage-regulator diodes D1 having different voltage values (Vbx1, Vbx2, Vbx3) of the breakdown voltage Vb. The magnitude relationship among the voltage values Vbx1, Vbx2, and Vbx3 is Vbx1<Vbx2<Vbx3.

Next, by using FIG. 8, another example of the operating-condition setting process executed by the control portion 9 will be described. It should be noted that process procedures similar to that in the above described operating-condition setting process (see FIG. 4) are given the same reference character, and description thereof is omitted. Specifically, in the operating-condition setting process according to the present embodiment, steps S801 to S803 are executed, and the process contents of step S407 is different from that in the first embodiment.

<Step S801>

At step S404, when the determination processing portion 47 determines that the current value is zero, the determination processing portion 47 determines, at the following step S801, whether or not the voltage value of the applied detection voltage Vd is Vd3. When the determination processing portion 47 determines that the voltage value of the detection voltage Vd is Vd3 (YES at step S801), the control portion 9 advances the process to step S405. On the other hand, when the determination processing portion 47 determines that the voltage value of the detection voltage Vd is not Vd3 (NO at step S801), the control portion 9 advances the process to step S407.

<Step S802>

At step S406, when the determination processing portion 47 determines that the photoconductor unit 23 installed in the apparatus main body 10 is a never-used product, the determination processing portion 47 determines, at the following step S802, whether or not changing of the voltage value of the detection voltage Vd has ended. When the determination processing portion 47 determines that changing of the voltage value of the detection voltage Vd has not ended (NO at step S802), the control portion 9 advances the process to step S803. On the other hand, when the determination processing portion 47 determines that changing of the voltage value of the detection voltage Vd has ended (YES at step S802), the control portion 9 advances the process to step S407.

<Step S803>

At step S803, the voltage control portion 46 changes the voltage value of the detection voltage Vd. Specifically, the voltage control portion 46 changes the voltage value of the detection voltage Vd sequentially in an order of Vd3, Vd2, and Vd1. Then, the control portion 9 returns the process to step S402. As a result, the detection voltage Vd is applied on the first electric pathway 31 from the power supply unit 30 sequentially with voltage values Vd3, Vd2, and Vd1. It should be noted that the voltage control portion 46 may change the voltage value of the detection voltage Vd sequentially in an order of Vd1, Vd2, Vd3. However, the detection voltage Vd is preferably applied in a descending order of the voltage value, since processes can be omitted for the photoconductor unit 23 that is not a never-used product, in which application of the detection voltage Vd is not performed after current not flowing through the second electric pathway 40 is detected when current did not flow even after the detection voltage Vd is applied with the largest voltage value Vd3.

<Step S407>

At step S407, the determination processing portion 47 executes a process for determining the type of the photoconductor unit 23. Specifically, the determination processing portion 47 specifies the voltage value of the breakdown voltage Vb of the voltage-regulator diode D1 in the photoconductor unit 23 installed in the apparatus main body 10, based on the current value indicated by the current detection signal. Then, the determination processing portion 47 determines the type of the photoconductor unit 23 based on the voltage value of the breakdown voltage Vb specified at step S407.

Figure 7:
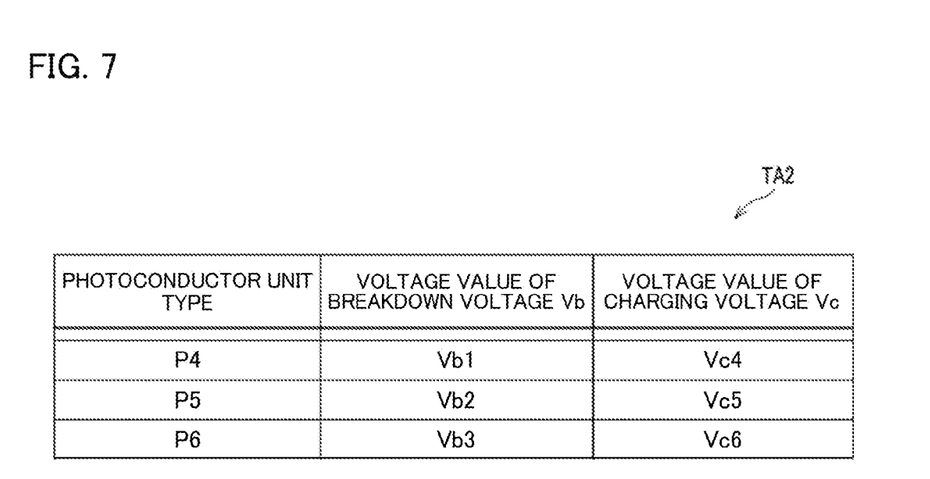
FIG. 7 shows table information indicating charging voltage and breakdown voltage corresponding to the type of the photoconductor unit.

Specifically, table information TA2 (see FIG. 7) showing the correspondence relationship among the voltage value of the breakdown voltage Vb, the type of the photoconductor unit 23, and the voltage value of a charging voltage Vd is stored in the ROM of the control portion 9, instead of the table information TA1. The determination processing portion 47 determines the type of the photoconductor unit 23 based on the table information TA2 and the voltage value of the breakdown voltage Vb specified at step S407.

As described above, in the image forming apparatus 1 according to the present embodiment, the second electric pathway 40 having the voltage-regulator diode D1 with the breakdown voltage Vb in accordance with the type of the photoconductor unit 23 is disposed in the photoconductor unit 23, and the second electric pathway 40 is blocked after specifying of a breakdown voltage Vx of the voltage-regulator diode D1. Thus, by using the second electric pathway 40, the image forming apparatus 1 can determine the type of the photoconductor unit 23 in accordance with the breakdown voltage Vb of the voltage-regulator diode D1, and determine whether or not the photoconductor unit 23 is a never-used product.

Third Embodiment

Next, a third embodiment of the present disclosure will be described. It should be noted that members, etc., in common with the first and second embodiments are given the same number as in the first and second embodiments, and description of contents in common with the first and second embodiments is omitted.

Figure 9:
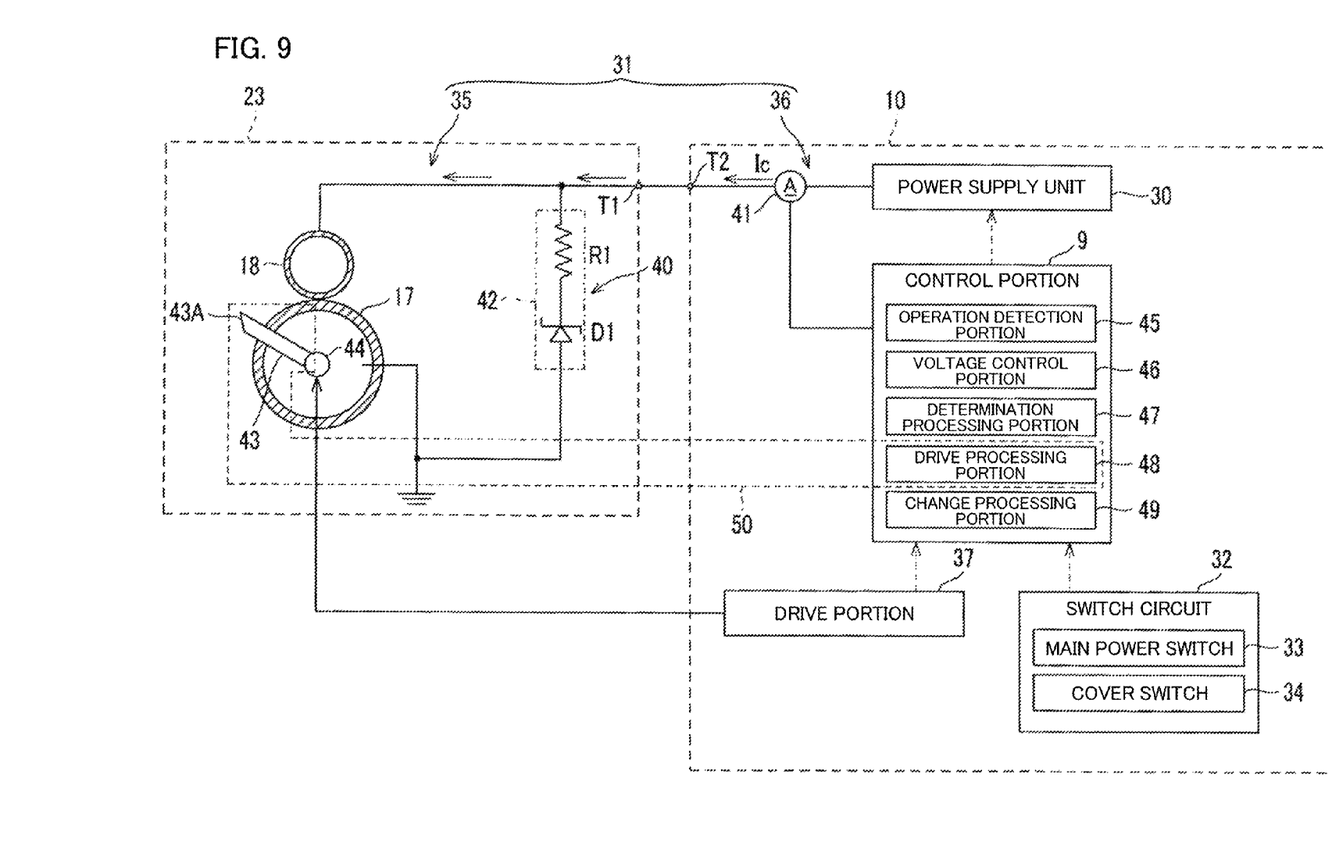
FIG. 9 shows a system configuration in the image forming apparatus according to a third embodiment of the present disclosure.

In the third embodiment, in order to determine the type of the photoconductor unit 23, as shown in FIG. 9, a series circuit 42 in which the resistive element R1 and the voltage-regulator diode D1 are connected in series is disposed on the second electric pathway 40 as the electrical component. The combination of the voltage value Vbx of the breakdown voltage Vb of the voltage-regulator diode D1 and the resistance value Rx of the resistive element R1 mounted on the series circuit 42 is different depending on the type of the photoconductor unit 23.

Figure 10A:
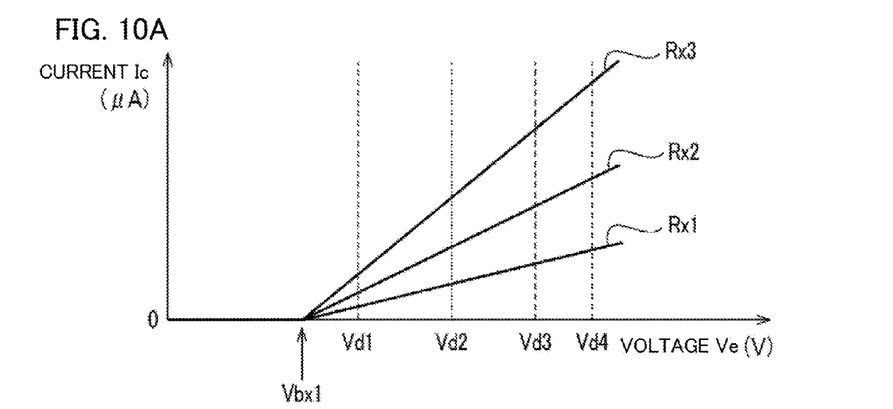
FIGS. 10A, 10B, and 10C are graphs showing current-voltage properties of series circuits according to the third embodiment.
Figure 10B:
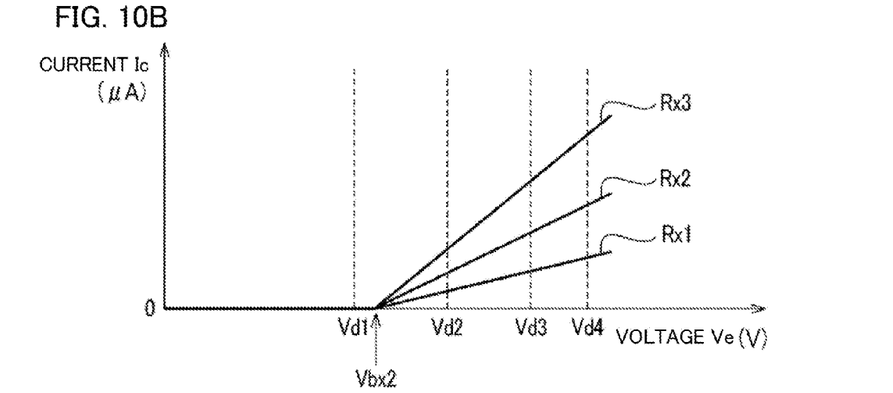
Figure 10C:
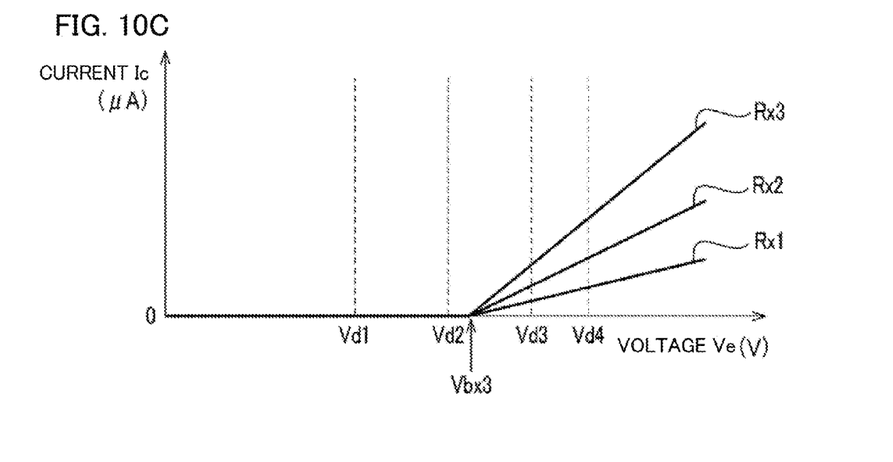

FIGS. 10A to 10C show the relationship between the voltage Ve and detection current Ic, wherein the horizontal axis represents a voltage value of the voltage Ve applied on the second electric pathway 40 (the series circuit 42 in which the resistive element R1 and the voltage-regulator diode D1 are connected in series) and the vertical axis represents a current value of the current (detection current) Ic flowing through the second electric pathway 40. FIGS. 10A to FIG. 10C each show a current-voltage property of the series circuit 42 in which the voltage-regulator diode D1 having the predetermined breakdown voltage Vb and three types of the resistive elements R1 having different resistance values (Rx1, Rx2, Rx3) are combined. The magnitude relationship among the resistance values Rx1, Rx2, and Rx3 is Rx1>Rx2>Rx3. Furthermore, FIGS. 10A to 10C show current-voltage properties in cases with different voltage values (Vbx1, Vbx2, Vbx3) of the breakdown voltage Vb of the voltage-regulator diode D1 combined with the above described resistive elements R1. The magnitude relationship among the voltage values Vbx1, Vbx2, and Vbx3, is Vbx1<Vbx2<Vbx3.

For example, as shown in FIG. 10A, as the resistance value Rx of the resistive element R1 mounted on the series circuit 42 becomes larger, the increase rate of the detection current Ic in response to an increase of the voltage Ve applied on the series circuit 42 becomes smaller. Thus, the relationship of the slopes in the graph is: resistive element with resistance value Rx1<resistive element with resistance value Rx2<resistive element with resistance value Rx3.

In the present embodiment, in addition to the voltage values Vd1 to Vd3 in the second embodiment, a voltage with a voltage value Vd4 that is larger than the voltage value Vd3 is applied as the detection voltage Vd. The determination processing portion 47 acquires, from the current detection portion 41, a current detection signal indicating the current value of the detection current Ic detected by the current detection portion 41 when the detection voltage Vd with the voltage value Vd3 and the voltage value Vd4 is applied. The determination processing portion 47 specifies the resistance value Rx of the resistive element R1 mounted in the photoconductor unit 23, based on the current values Ic3 and Ic4 of the detection current Ic detected by the current detection portion 41 when the detection voltage Vd with the voltage values Vd3 and Vd4 is applied.

Thus, the determination processing portion 47 specifies, as the resistance value Rx of the resistive element R1, (Vd4-Vd3)/(Ic4-Ic3) which is a ratio of change level (Vd4-Vd3) of the voltage values Vd3 and Vd4 of the detection voltage Vd with respect to a change level (Ic4-Ic3) of the current values Ic3 and Ic4 of the detection current Ic.

It should be noted that the breakdown voltage Vb of the voltage-regulator diode D1 can be specified similarly to the second embodiment, based on the current value of the detection current Ic detected by the current detection portion 41 when the detection voltage Vd of the voltage values Vd1 to Vd3 is applied. More specifically, the processes at steps S402 to S408 and S801 to S803 in FIG. 8 are performed.

Figure 8:
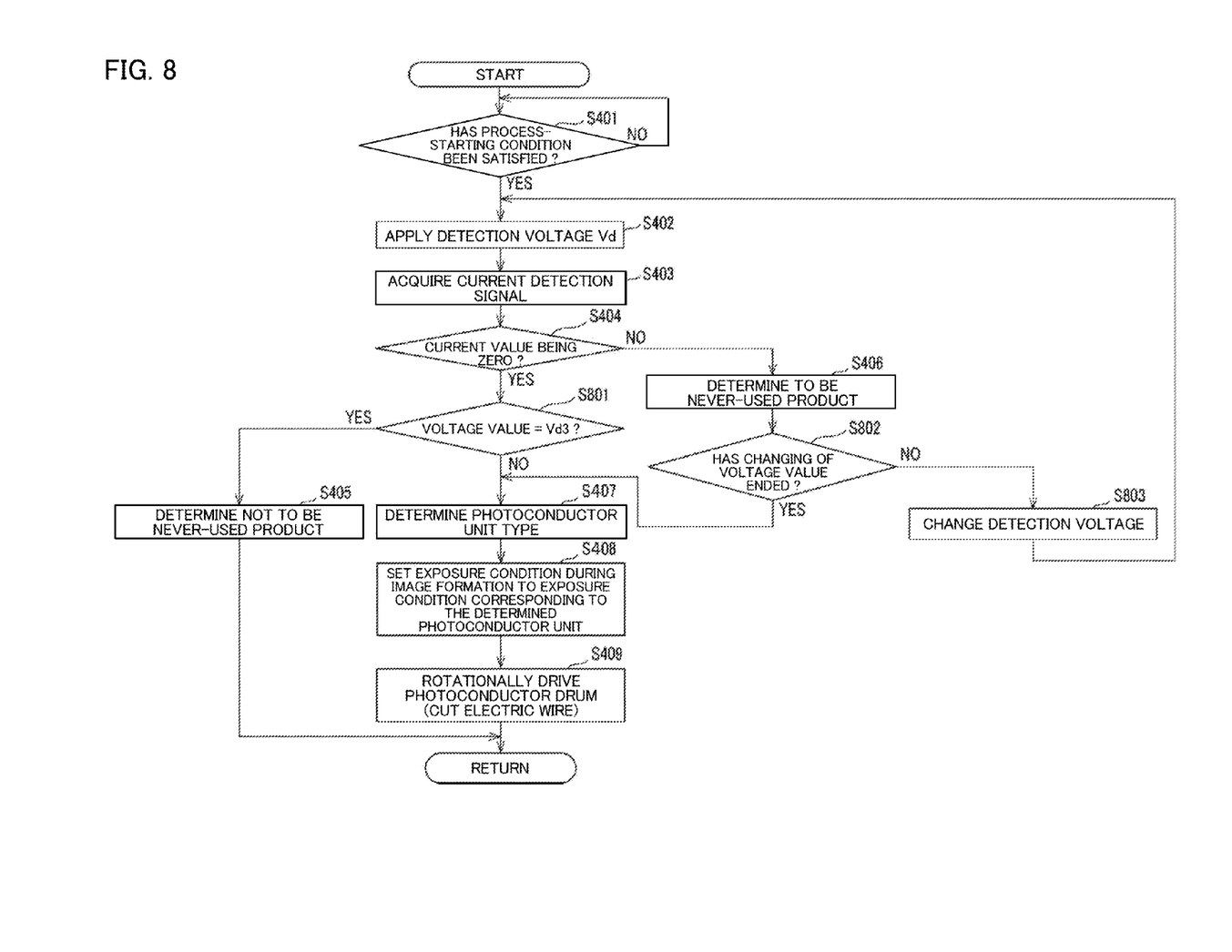
FIG. 8 is a flowchart showing an operating-condition setting process for the photoconductor unit performed by the control portion.

Thus, after the process at step S401 in FIG. 8, the determination processing portion 47 calculates the resistance value Rx of the resistive element R1 based on the voltage values Vd3 and Vd4 of the detection voltage Vd and the current values Ic3 and Ic4 of the detection current Ic, and then executes the process at step S402. In this case, the application of the detection voltage Vd with the voltage value Vd3 and the detection of the detection current Ic by the current detection portion 41 are each performed twice for the calculation of the resistance value Rx and the calculation of the breakdown voltage Vb, resulting in waste of processing. Thus, when the control portion 9 starts the process at step S402 if the voltage value of the detection voltage Vd is switched from Vd4 to Vd3, the waste of processing as described above is eliminated.

The determination processing portion 47 determines either one of the charge property and the sensitivity property of the photoconductor drum 17 in the photoconductor unit 23 in accordance with the resistance value Rx, and determines the other one in accordance with the breakdown voltage Vx. In the present embodiment, the determination processing portion 47 determines the charge property of the photoconductor drum 17 in accordance with the resistance value Rx of the resistive element R1, and determines the sensitivity property of the photoconductor drum 17 in accordance with the voltage value of the breakdown voltage Vb.

After the processes described above, the determination processing portion 47 determines the type of the photoconductor unit 23 based on a combination of the charge property of the photoconductor drum 17 and the sensitivity property of the photoconductor drum 17. More specifically, table information (not shown) defining the correspondence relationship between the type of the photoconductor unit 23 and the combination of the breakdown voltage Vb and the resistance value Rx of the resistive element R1 is pre-stored in the ROM of the control portion 9. The determination processing portion 47 determines, based on the table information, the type of the photoconductor unit 23 corresponding to the combination of the breakdown voltage Vb and the resistance value Rx of the resistive element R1.

As described above, according to the present embodiment, the determination processing portion 47 can detect the type of the photoconductor unit 23 based on the combination of the voltage value Vbx of the breakdown voltage Vb of the voltage-regulator diode D1 and the resistance value Rx of the resistive element R1. As a result, when compared to the first and second embodiments, more types of the photoconductor unit 23 can be detected. In the present embodiment, since the number of types of the resistive element R1 is three and the number of types of the voltage-regulator diode D1 is three, nine types of the photoconductor unit 23 can be determined at maximum.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a photoconductor unit including a photoconductor;
a charging portion configured to charge the photoconductor;
an apparatus main body configured to detachably support the photoconductor unit;
a first electric pathway configured to connect the charging portion and a power supply unit;
a second electric pathway formed in the photoconductor unit and configured to connect the first electric pathway and the photoconductor;
an electrical component disposed on the second electric pathway and having a predetermined electrical property in accordance with a type of the photoconductor unit;
a voltage control portion configured to apply a preset detection voltage on the first electric pathway from the power supply unit;
a current detection portion configured to detect current flowing through the second electric pathway when the detection voltage is applied on the first electric pathway;
a determination processing portion configured to determine the type of the photoconductor unit and existence of usage of the photoconductor unit, based on a current value detected by the current detection portion; and
a blocking portion configured to block the second electric pathway after determination by the determination processing portion.

2. The image forming apparatus according to claim 1, further comprising a drive portion configured to rotationally drive the photoconductor, wherein
the blocking portion includes a drive processing portion configured to drive the drive portion after determination by the determination processing portion, and a cutting member configured to cut the second electric pathway through movement associated with rotational driving of the photoconductor.

3. The image forming apparatus according to claim 1, further comprising a drive portion configured to rotationally drive the photoconductor, wherein
the second electric pathway is connected to the photoconductor at a position where an acceptable tension is exceeded associated with rotational driving of the photoconductor, and
the blocking portion is configured to drive the drive portion after determination by the determination processing portion.

4. The image forming apparatus according to claim 1, wherein
the electrical component includes a resistive element having a resistance value that is preset in accordance with the type of the photoconductor unit, and
the determination processing portion is configured to specify the resistance value based on the current value detected by the current detection portion when the detection voltage is applied, and determine the type of the photoconductor unit in accordance with the resistance value.

5. The image forming apparatus according to claim 1, wherein
the electrical component includes a voltage-regulator diode having a breakdown voltage that is preset in accordance with the type of the photoconductor unit,
the voltage control portion is configured to sequentially apply a plurality of the detection voltages on the first electric pathway, and
the determination processing portion is configured to specify the breakdown voltage based on the current value detected by the current detection portion when the detection voltages are each applied, and determine the type of the photoconductor unit in accordance with the breakdown voltage.

6. The image forming apparatus according to claim 1, wherein
the electrical component includes a resistive element having a resistance value that is preset in accordance with the type of the photoconductor unit, and a voltage-regulator diode having a breakdown voltage that is preset in accordance with the type of the photoconductor unit,
the voltage control portion is configured to sequentially apply a plurality of the detection voltages on the first electric pathway, and
the determination processing portion is configured to specify the breakdown voltage and the resistance value based on the current value detected by the current detection portion when the detection voltages are each applied, and determine the type of the photoconductor unit in accordance with a combination of the resistance value and the breakdown voltage.

7. The image forming apparatus according to claim 6, wherein
the determination processing portion is configured to determine either one of a charge property and a sensitivity property of the photoconductor in the photoconductor unit in accordance with the resistance value and determine the other one in accordance with the breakdown voltage, and determine the type of photoconductor unit based on the charge property and the sensitivity property.

8. The image forming apparatus according to claim 1, further comprising a change processing portion configured to change image forming conditions for the image forming apparatus in accordance with the type of the photoconductor unit determined by the determination processing portion.

9. The image forming apparatus according to claim 1, wherein
the charging portion is disposed in the photoconductor unit,
the first electric pathway includes a third electric pathway formed in the photoconductor unit and a fourth electric pathway formed in the apparatus main body, and
the third electric pathway and the fourth electric pathway are connected when the photoconductor unit is installed in the apparatus main body.

* * * * *